Aug. 11, 1970          H. S. WOLF          3,523,422

TWO-STAGE LIQUID ROCKET POWERPLANT

Filed March 3, 1964          3 Sheets-Sheet 1

INVENTOR.
HERBERT S. WOLF
BY
AGENT

INVENTOR.
HERBERT S. WOLF
BY
AGENT

Aug. 11, 1970     H. S. WOLF     3,523,422
TWO-STAGE LIQUID ROCKET POWERPLANT

Filed March 3, 1964     3 Sheets-Sheet 3

INVENTOR.
HERBERT S. WOLF
BY
AGENT

United States Patent Office 3,523,422
Patented Aug. 11, 1970

3,523,422
TWO-STAGE LIQUID ROCKET POWERPLANT
Herbert S. Wolf, Denville, N.J., assignor to Thiokol Chemical Corporation, Bristol, Pa., a corporation of Delaware
Filed Mar. 3, 1964, Ser. No. 349,043
Int. Cl. F02k 3/00
U.S. Cl. 60—224                                    10 Claims This invention relates generally to reaction motors and more particularly to an improved two-stage, liquid propellant rocket powerplant having concentric booster and sustainer thrust chambers.

The use of concentric thrust chambers to conserve space is known in the art but these prior usages have been inefficient due to the tendency of the booster chamber after cut-off to act as an aspirator upon reduction in pressure. This resulted in the flowing of some of the sustainer chamber exhaust gases into the then non-operative booster chamber with a consequent loss in propulsive efficiency. The prior art devices have also been overly complex as to their arrangement of propellant conduits and the controls therefor so as to render the powerplants impractical of construction.

Accordingly, the main object of the present invention is to provide an improved two stage, liquid propellant rocket powerplant having concentric booster and sustainer thrust chambers which obviates the above and other disadvantages characterizing known devices of the type.

An important object of the present invention is to provide an improved, packaged liquid propellant rocket powerplant of minimum size due to concentric booster and sustainer thrust chambers so arranged as to obviate the normal performance losses of known booster and sustainer chamber arrangements.

Another important object of the present invention is to provide a two stage rocket powerplant in which the booster and sustainer thrust chambers are simultaneously operable during boost phase and in which the booster chamber may be shut off on command, leaving only the sustainer chamber in operation for the full duration of operation.

Another important object of the present invention is to provide a novel two-stage rocket powerplant in which the sustainer thrust chamber is movable from a position where the exit plane of its exhaust nozzle is within or just forward of that of the booster thrust chamber before operation, and moves to a position outside of or just aft of that of the booster thrust chamber upon operation of the powerplant.

Another important object of the present invention is to provide a two stage, packaged, liquid propellant rocket powerplant having concentric thrust chambers one of which is mounted on a shear slide movable by generated gas pressure to initiate propellant flow and to properly position the thrust chambers with respect to each other to eliminate performance losses.

Other objects and advantages of the present invention will become apparent during the course of the following description.

In the drawings I have shown one embodiment of the invention. In this showing:

Figure 1:
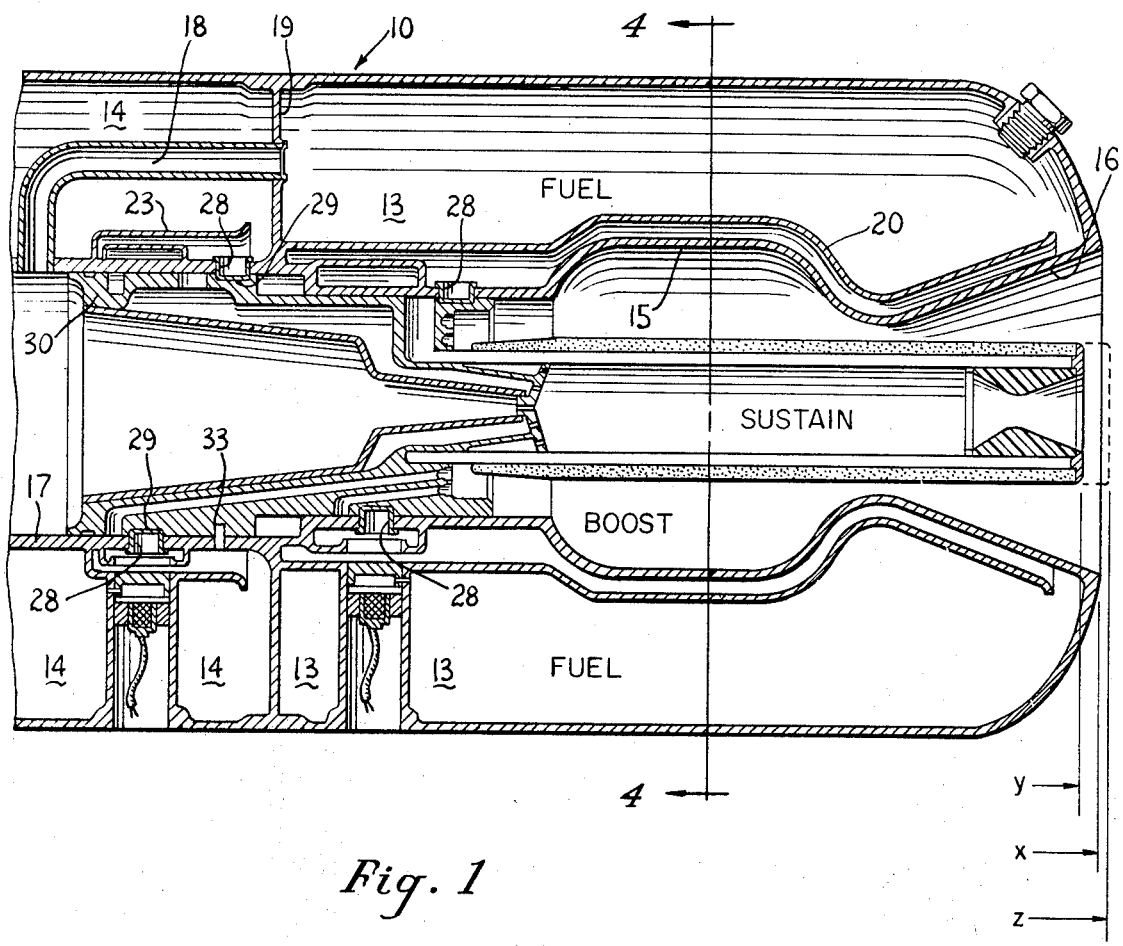
FIG. 1 is a central, longitudinal sectional view of the two stage, liquid propellant rocket powerplant comprising the present invention in the storage condition.

For purposes of illustration, the invention is disclosed in a bi-propellant application although it will be appreciated that the principles of the invention are also applicable with monopropellants, tripropellants, etc. Similarly, the sustainer thrust chamber is shown as movable and positioned within the booster thrust chamber although the relative movement between the chambers and/or their relative concentric positions may be varied.

Referring to the drawings, numeral 10 designates the packaged, liquid propellant, rocket powerplant as a whole which includes annular fuel and oxidizer tanks 13 and 14 which respectively define a booster thrust chamber 15 terminating in an exhaust nozzle 16 and a gas generator chamber 17 which contains a solid propellant and ignition means therefor (not shown). Upon ignition, pressurizing gases pass from the generating chamber 17 to the fuel tank 13 by a conduit 18 terminating at a rocket strengthening header 19 separating the tanks 13 and 14.

A similar conduit (not shown) conducts pressurizing gases to the forward end of the oxidizer tank and the pressurized fuel and oxidizer are respectively forced, during operation, around the ends of annular baffles 20 and 23 which are spaced from but adjacent the thrust chamber 15 and the generator chamber 17, to fuel discharge ports 24 and 25 and oxidizer discharge ports 26 and 27. The specified ports are in circumferentially spaced groups in the inner walls of the tanks 13 and 14 and it will be noted that ports 24 and 26 are axially spaced rearwardly or aft of the ports 25 and 27.

Figure 2:
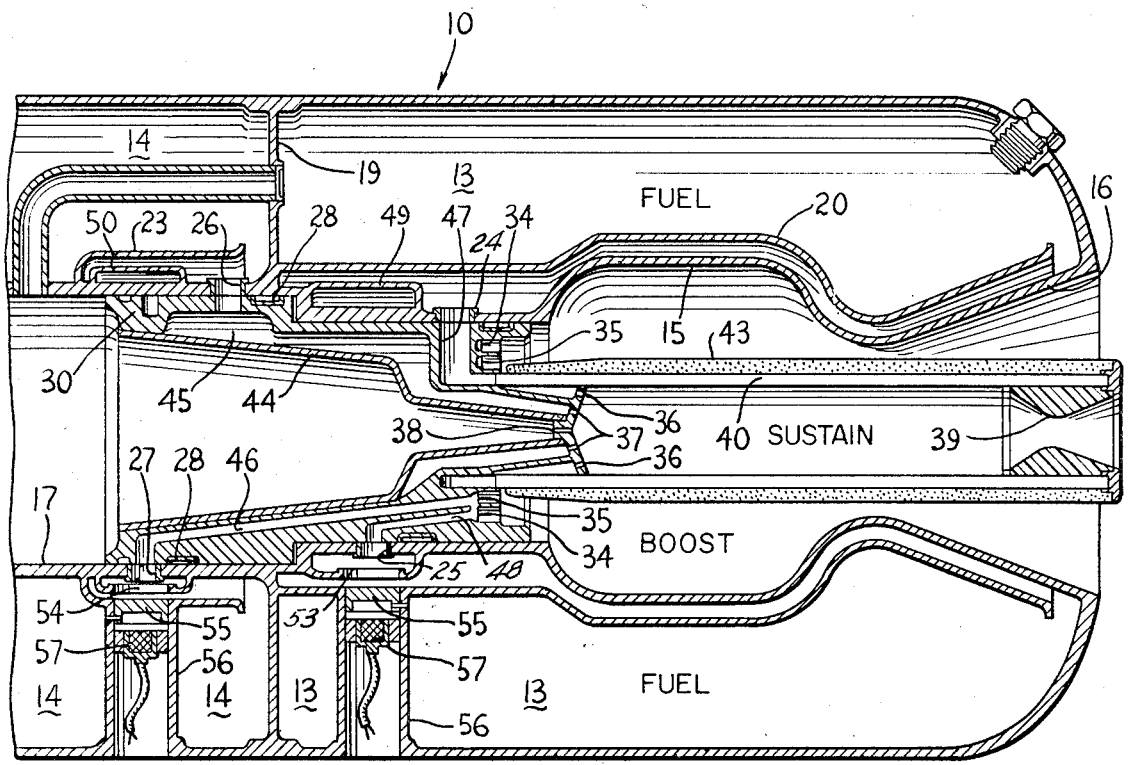
FIG. 2 is a similar view thereof in operative position for boost phase operation.

The ports 24, 25, 26, and 27 are all sealed during storage by shear cups 28 which have radially inwardly projecting portions seated in recesses 29 formed in a shear slide 30 which is slidably mounted in the inner tankage walls for movement from the first or storage position of FIG. 1 where it is retained by a shear pin 33, to the second or operative position of FIG. 2.

The shear slide 30 is provided at its aft end with a closing header having outer, circumferentially spaced, fuel and oxidizer injection orifices 34 and 35 respectively communicating with the interior of the booster thrust chamber 15, and a reduced, central, aft-extending portion including circumferentially spaced, fuel and oxidizer injection orifices 36 and 37 and a central generator gas orifice 38, upon which a sustainer thrust chamber 40 terminating in an exhaust nozzle 39 is fixedly mounted. The thrust chamber 40 is preferably provided with an outer ceramic liner 43 to withstand the high operating temperatures involved.

The forward end of the shear slide 30 is closed by a rearwardly tapered header 44 which co-operates with the physical inner outline of the slide to define an oxidizer passage 45 leading to the injection orifices 37 to the sustainer thrust chamber 40 from the ports 26. A second oxidizer passage 46 formed in the slide 30 leads to the injection orifices 35 of the booster chamber 15 from the ports 27. Similarly, fuel passages 47 and 48 lead to the injection orifices 36 and 34 of the sustainer and booster chambers respectively from the ports 24 and 25.

Figure 3:
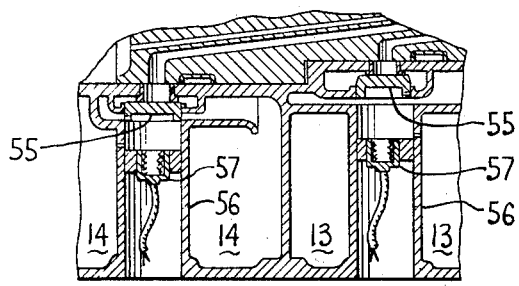
FIG. 3 is a similar fragmentary view thereof in operable position for sustained phase operation.
Figure 4:
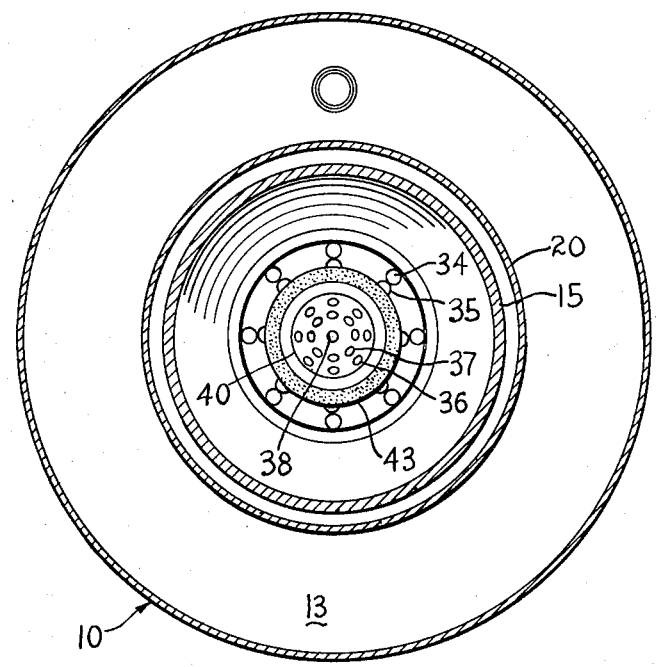
FIG. 4 is a transverse sectional view of the powerplant taken on the line 4—4 of FIG. 1.

As shown in FIGS. 1 to 3, the fuel ports 25 and the oxidizer ports 27 which furnish propellants to the booster thrust chamber injection orifices 34 and 35 are enclosed by manifolds 49 and 50 respectively into which fuel and oxidizer is furnished during operation by the pressure of the generated pressure gases, by ports 53 and 54. In order that propellants to the booster thrust chamber 15 may be cut off on command at the expiration of boost phase operation, a pair of manifold port closure valves 55 are mounted in tubes 56 radially aligned with the ports 53 and 54. Electrically ignitable squibs 57 are positioned behind the valves 55, and upon actuation, force the valves 55 (FIG. 3) into the ports 53 and 54 where they seat against the ports 25 and 27 to seal off propellant flow to the booster thrust chamber 15.

OPERATION

The packaged liquid propellant rocket powerplant is removed from storage, etc. in the position shown in FIG. 1 in which the sustainer thrust chamber 40 is within the booster thrust chamber 15, the exit plane y of the former being forwardly of the exit plane x of the latter and maintained by the shear pin 33 so that it may not be accidentally jarred from the storage position.

When the solid propellant (not shown) in the generator chamber 17 is ignited, generated gases pressurize the fuel and oxidizer tanks as explained. Pressurized gases also act against the tapered head 44 of the shear slide, and upon attainment of a predetermined pressure, shear the pin 33 and force the shear slide 30 to the right from the position of FIG. 1 to the position of FIG. 2 where it is stopped by the shoulder of the manifold 49. Such movement of the shear slide shears off the shear cups 28 and aligns shear slide fuel passages 47 and 48 with ports 24 and 25 and oxidizer passages 45 and 46 with ports 26 and 27 to permit flow of the pressurized fuel and oxidizer to the booster and sustainer thrust chambers 15 and 40.

It is to be noted that such movement of the shear slide also moves the sustainer thrust chamber and the exit plane of the sustainer nozzle 39 to a position z aft of the position x of the booster nozzle 16 so that upon cut-off, the boost thrust chamber cannot act as an aspirator to drain off sustainer thrust chamber gases and reduce the efficiency of the powerplant.

Upon conclusion of the boost phase operation, the squibs 57 are fired to cut off flow of the propellants to the booster thrust chamber by the valves 55, the sustainer thrust chamber furnishing the only propulsive effort during the remainder of operation.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:
1. The combination with a liquid propellant rocket powerplant including propellant tankage defining a thrust chamber terminating in an exhaust nozzle, propellant inlet ports formed in said tankage and communicating with the thrust chamber to admit propellant thereto, shear cups sealing said ports, and a shear slide supporting said cups and movable upon rocket ignition from a storage position to a second position to shear the cups and admit propellant into the thrust chamber; of a second thrust chamber terminating in an exhaust nozzle mounted in the first thrust chamber on the slide for movement therewith and communicating with said ports to provide a two stage propulsive effect.

2. The combination recited in claim 1, and valves controlling the flow of propellant to one of said thrust chambers and operable to cut off its propulsive effect.

3. The combination recited in claim 1 wherein the exit plane of the exhaust nozzle of said second chamber is aft of the exit plane of the exhaust nozzle of the other thrust chamber when the shear slide is in the second position.

4. The combination recited in claim 3, and valves controlling the flow of propellant to one of said thrust chambers and operable to cut off its propulsive effect.

5. A liquid two stage propellant rocket powerplant comprising, in combination, propellant tankage defining a first thrust chamber terminating in an exhaust nozzle, a second thrust chamber including an exhaust nozzle mounted concentrically of and within said first chamber and extending aft thereof in operative position, and means for supplying propellant from said tankage to said thrust chambers to effect simultaneous operation thereof for boost phase thrust, said means including a shear slide movable from a storage to the operative position to admit propellant to both said thrust chambers and said second thrust chamber being fixed to said slide for movement to said aft extending operative position.

6. The combination recited in claim 5, and means for terminating propellant supply to one of said chambers to effect sustainer phase thrust.

7. A two stage liquid (propellant rocket powerplant comprising, in combination, an annular propellant tank defining a first combustion chamber terminating in a nozzle and a generator chamber and having ports communicating therewith, a second combustion chamber including an exhaust nozzle slidably mounted in said first combustion chamber for movement from a first position to a second position and including a head separating it and said generator chamber, passages formed in said second chamber and connecting both of said combustion chambers with said combustion chamber communicating ports when said second chamber is in said second position, and shear cups sealing said combustion chamber communicating ports and supported by said second chamber whereby pressure of gases from said generator chamber acting on said head moves said second chamber to said second position to shear said shear cups and admit propellant from said tank to both of said combustion chambers.

8. The combination recited in claim 7, and valve means controlling propellant flow to one of said combustion chambers and operative to shut it off.

9. The combination recited in claim 7 wherein the exit plane of the exhaust nozzle of said second combustion chamber is aft of the exit plane of the exhaust nozzle of said first combustion chamber when said second combustion chamber is in said second position.

10. The combination recited in claim 9, and valve means controlling propellant flow to one of said combustion chambers and operative to shut it off.

References Cited

UNITED STATES PATENTS

| 2,686,473 | 8/1954 | Vogel | 60—35.6 |
| 3,034,293 | 5/1962 | Ferris et al. | 60—35.6 |
| 3,093,964 | 6/1963 | Hausmann | 60—35.6 |
| 3,094,837 | 6/1963 | Sherman et al. | 60—35.6 |

SAMUEL FEINBERG, Primary Examiner

U.S. Cl. X.R.
60—258, 259, 39.48